(12) United States Patent
Koike et al.

(10) Patent No.: US 7,775,756 B2
(45) Date of Patent: Aug. 17, 2010

(54) BUCKET TRANSFER APPARATUS

(75) Inventors: Naoki Koike, Toyonaka (JP); Hiroyuki Koshio, Toyonaka (JP); Tatsuaki Kunimoto, Toyonaka (JP); Takashi Itou, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 0 days.

(21) Appl. No.: 11/578,246

(22) PCT Filed: Apr. 12, 2004

(86) PCT No.: PCT/JP2004/005209

§ 371 (c)(1),
(2), (4) Date: Oct. 12, 2006

(87) PCT Pub. No.: WO2005/100212

PCT Pub. Date: Oct. 27, 2005

(65) Prior Publication Data

US 2007/0212202 A1    Sep. 13, 2007

(51) Int. Cl.
*B65G 1/00* (2006.01)
(52) U.S. Cl. .................. 414/331.11; 414/268
(58) Field of Classification Search ........... 414/331.06, 414/331.08, 331.1, 331.11, 621; 254/934, 254/2 B, 2 R; 294/902
See application file for complete search history.

(56) References Cited

U.S. PATENT DOCUMENTS

| | | | | |
|---|---|---|---|---|
| 3,637,095 A | * | 1/1972 | Kampfer | 414/331.07 |
| 4,066,178 A | * | 1/1978 | Carson | 414/420 |
| 4,810,155 A | * | 3/1989 | D'Agnolo | 414/331.08 |
| 5,329,952 A | * | 7/1994 | Kojima et al. | 134/133 |
| 5,988,858 A | * | 11/1999 | Yuyama et al. | 700/230 |
| 6,042,323 A | * | 3/2000 | Cervantes et al. | 414/331.08 |

FOREIGN PATENT DOCUMENTS

| | | |
|---|---|---|
| JP | 48-6451 | 1/1973 |
| JP | 59-124603 | 7/1984 |
| JP | 5-24605 | 2/1993 |
| JP | 6-316308 | 11/1994 |
| JP | 8-12016 | 1/1996 |
| JP | 8-310625 | 11/1996 |
| JP | 9-51922 | 2/1997 |
| JP | 9-92160 | 4/1997 |
| JP | 2002-265022 | 9/2002 |
| JP | 2004-137050 | 5/2004 |

* cited by examiner

*Primary Examiner*—Saúl J Rodríguez
*Assistant Examiner*—Joshua I Rudawitz
(74) *Attorney, Agent, or Firm*—Wenderoth, Lind & Ponack, L.L.P.

(57) ABSTRACT

A bucket carrier for carrying buckets (2) to store them in each storage shelf of a cart (4), the bucket carrier comprising a holding means (20) for holding buckets (2), and carrier means (28) for carrying the buckets (2) held by the holding means (20) to each storage shelf (49) of the cart (4). The arrangement is such that the holding means (20) and a transfer means (49) are drive-controlled so that the buckets (2) are stored in the storage shelves (49) obliquely from above. Thereby, the buckets (2) can be automatically stored in the cart (4).

10 Claims, 7 Drawing Sheets

BUCKET TRANSFER APPARATUS

BACKGROUND OF THE INVENTION

1. Technical Field

The present invention relates to a bucket transfer apparatus.

2. Description of the Related Art

When transferring medications from a pharmacy department, medications for one patient are conventionally placed in a bucket and are automatically transferred to a nurse station using a transfer apparatus (see, for instance, Japanese Laid-Open Patent Publication No. 8-310625). However, since it is ineffective to individually transfer those buckets from the nurse station to the respective patient rooms, a plurality of buckets are stored in a cart whereupon they are collectively transferred.

However, it is extremely troublesome to store all of the many buckets on the cart. Moreover, due to employment of an arrangement that prevents the stored buckets from falling off during transfer on the cart, there is a drawback in that they are hard to store. Thus, it has long been desired to provide an arrangement in which buckets can be automatically stored on carts.

SUMMARY OF THE INVENTION

The present invention thus aims to provide a bucket transfer apparatus that is capable of automatically storing buckets on a cart.

As a means for solving the problem, the present invention provides a bucket transfer apparatus for transferring buckets and storing them in respective storage racks of a cart. The device includes a holding means for holding the buckets, and a transfer means for transferring the buckets held by the holding means to the respective storage racks of the cart.

The holding means and the transfer means are driven and controlled such that the buckets are stored from obliquely above with respect to the storage racks.

A conventional storage rack, arranged to prevent falling off of buckets during transfer, was provided with projections on both ends of guiding grooves of the racks so that it was hard to store the buckets from directions parallel to the racks. According to the arrangement of the present invention, since buckets are stored from obliquely above, it is possible to smoothly deliver the buckets to the racks.

It is preferable that the holding means includes opening/closing arms for closing while lifting to hold a bucket from both sides and opening while descending to release the bucket, and push-out portions for pushing the bucket held by the opening/closing arms out in a horizontal direction.

When pushing the bucket out by the push-out portions, a rear wall of the bucket, below a brim portion on its rear end side, is pushed, and when a front end of the bucket is located above a lower edge portion of the storage rack on an intrusion side, the opening/closing arms are opened while descending to move the bucket down while releasing the holding condition of the bucket. Thus, it is possible to smoothly store the bucket on a storage rack of the cart with the use of a simple arrangement.

It is further preferable that the device includes a turning means for turning the bucket, and reading means for reading an identification card attached to an outer side of the bucket.

The turning means is driven and controlled so as to allow the identification card to be read by the reading means, and the bucket is transferred to the cart by the transfer means so that the identification card is located on the same surface side. Thus, it is possible to reliably and easily read the identification card irrespective of the direction of the bucket.

It is preferable that the transfer means includes a bucket detecting means for detecting the presence/absence of a bucket in the storage rack. The transfer means is driven and controlled based on a detection signal of the bucket detecting means for transferring the bucket to an empty storage rack.

It is preferable that the cart includes fixing means for fixing the buckets stored in the storage rack, that the device includes a non-fixed condition detecting means for detecting a non-fixed condition by the fixing means, and that the bucket is transferred by the transfer means based on the detection signal of the non-fixed condition detecting means.

According to the present invention, since buckets can be stored from obliquely above with respect to the storage rack, it is possible to achieve the effect of performing storage operations automatically and smoothly.

DETAILED DESCRIPTION OF THE INVENTION

An embodiment of the present invention will be explained in accordance with the accompanying drawings.

Figure 1:
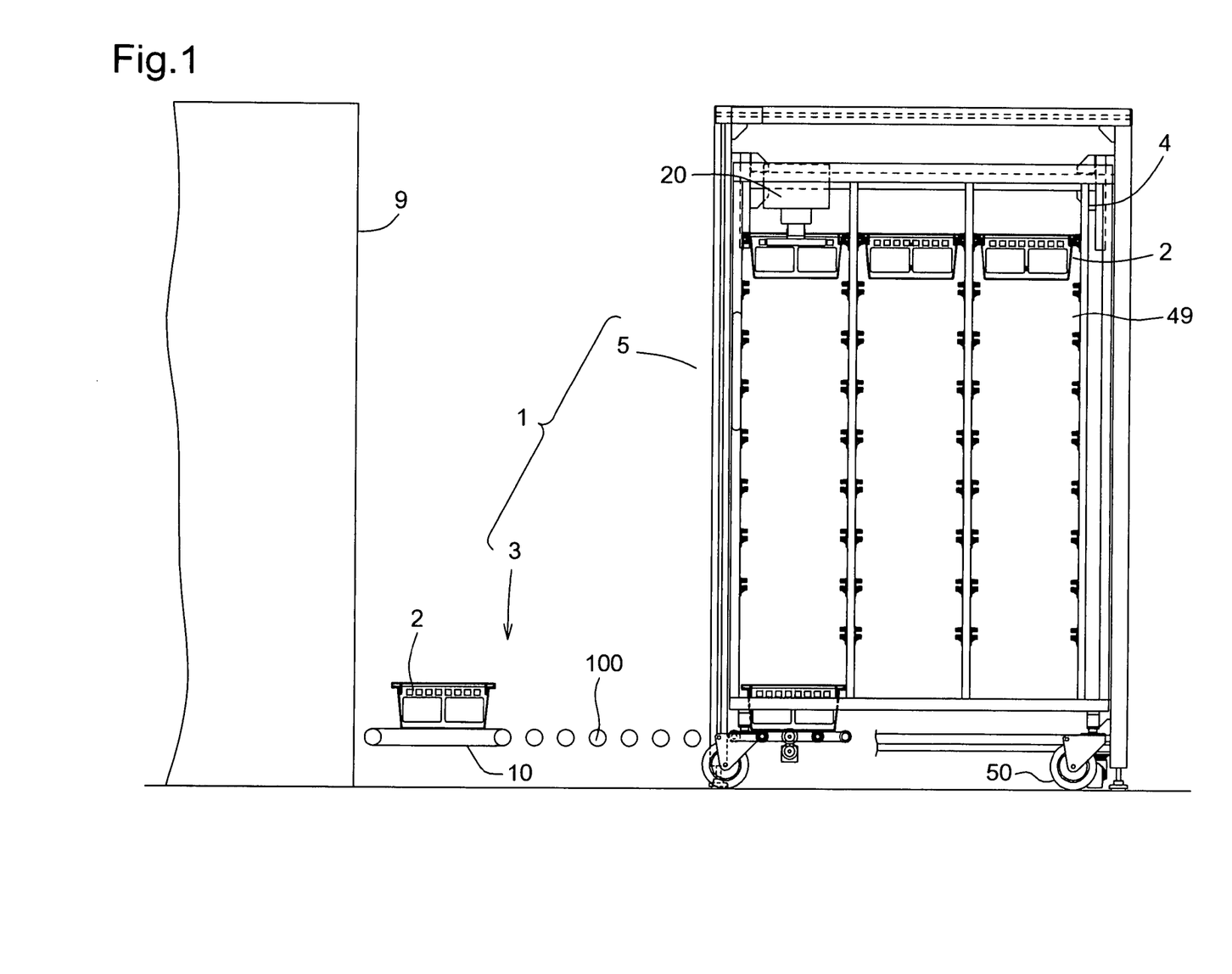
FIG. 1 is a front view of the bucket transfer apparatus according to the present embodiment.
Figure 2:
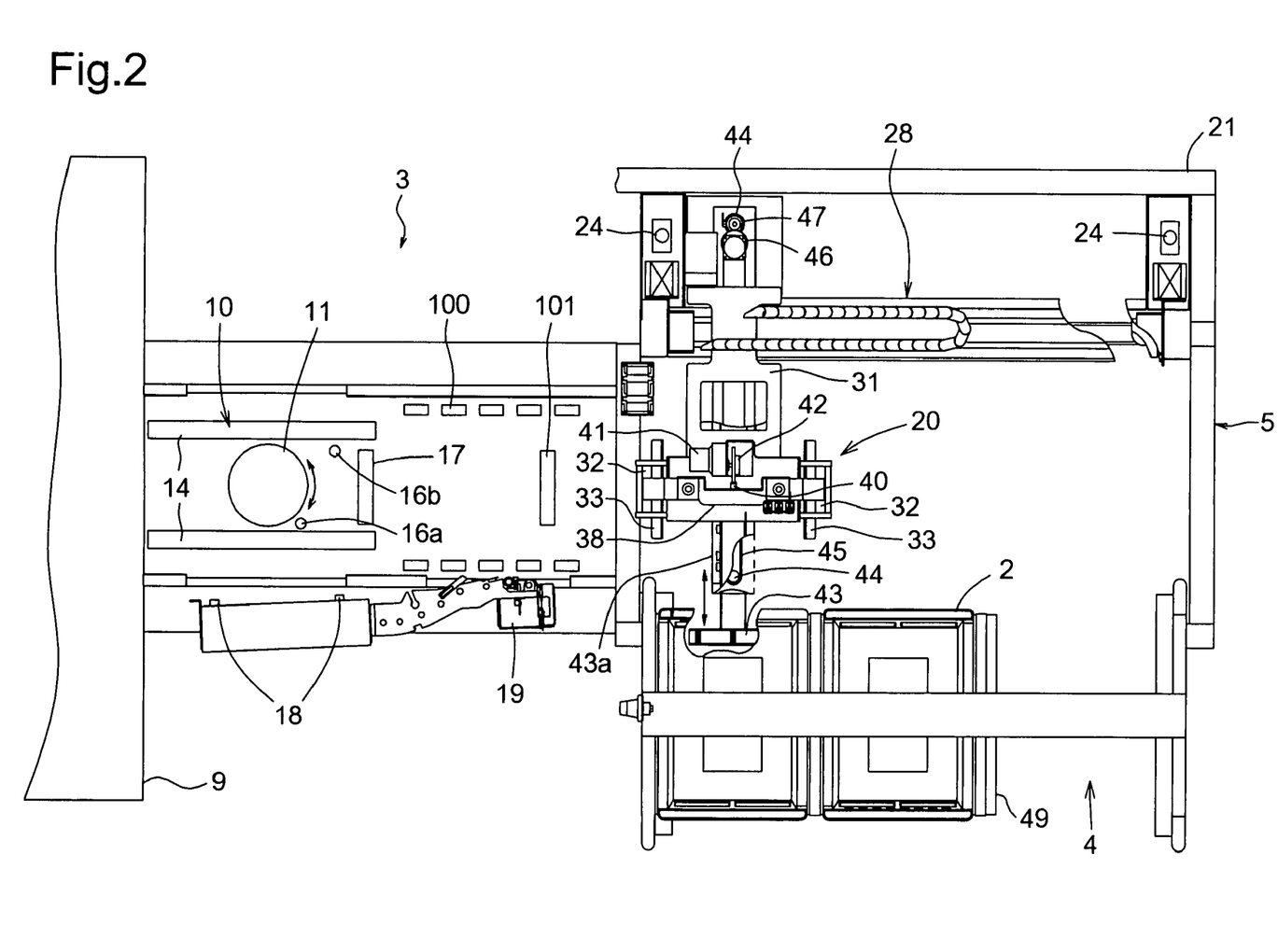
FIG. 2 is a plan view of FIG. 1.
Figure 3:
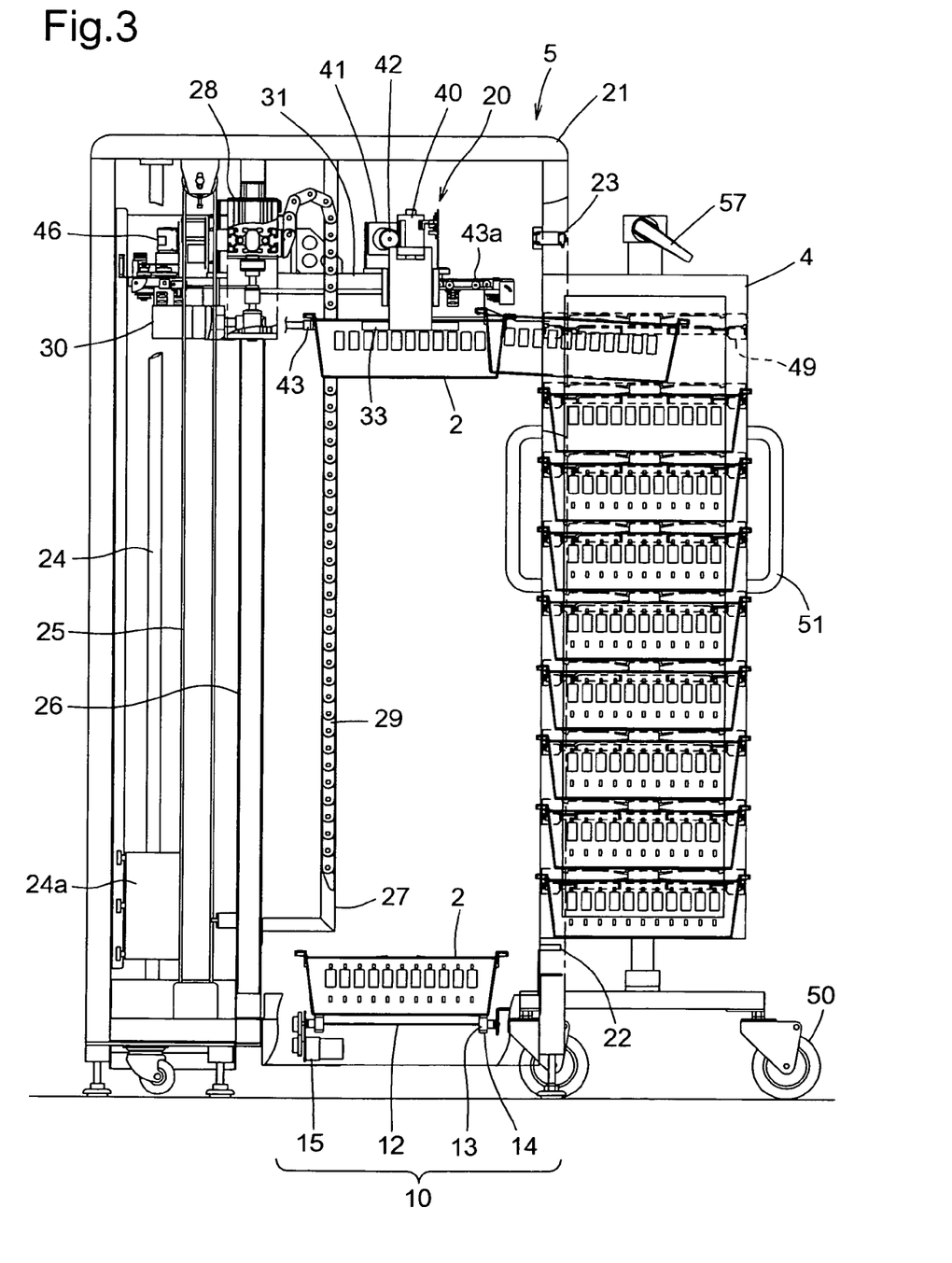
FIG. 3 is a left-hand side view of FIG. 1.

FIGS. 1 to 3 show a bucket transfer apparatus 1 according to the present embodiment. This transfer apparatus 1 includes a direction-changing portion 3 for changing directions of buckets 2, and a transfer portion 5 for transferring the buckets 2 to a cart 4.

Figure 4A:
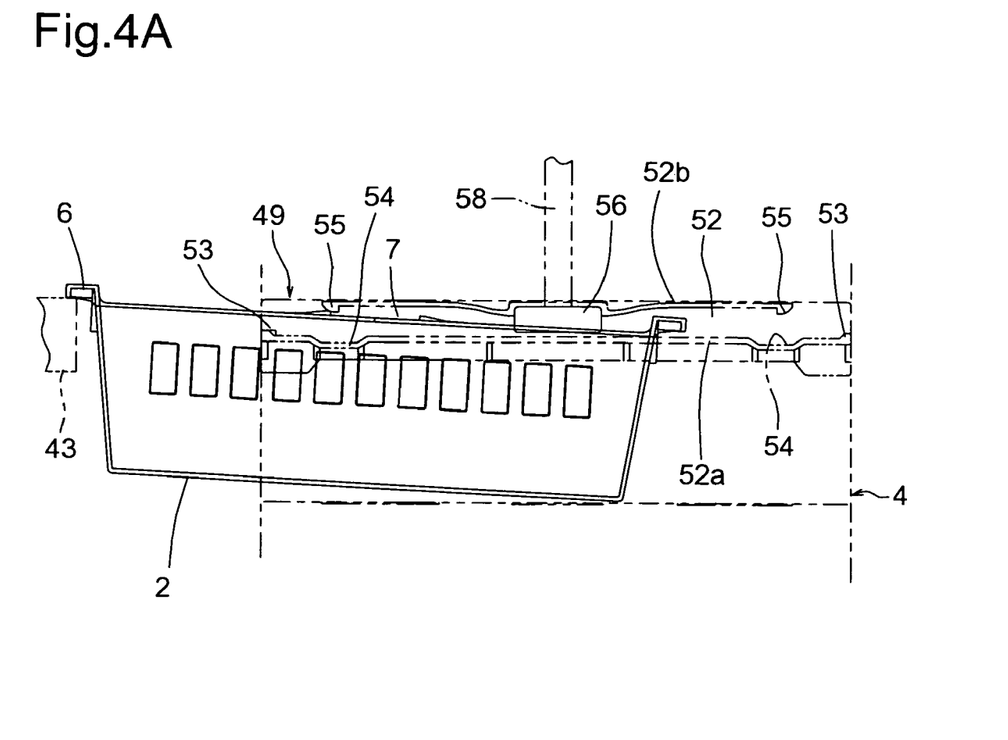
FIG. 4A is a side view showing a bucket on its way to being stored in a cart.
Figure 4B:
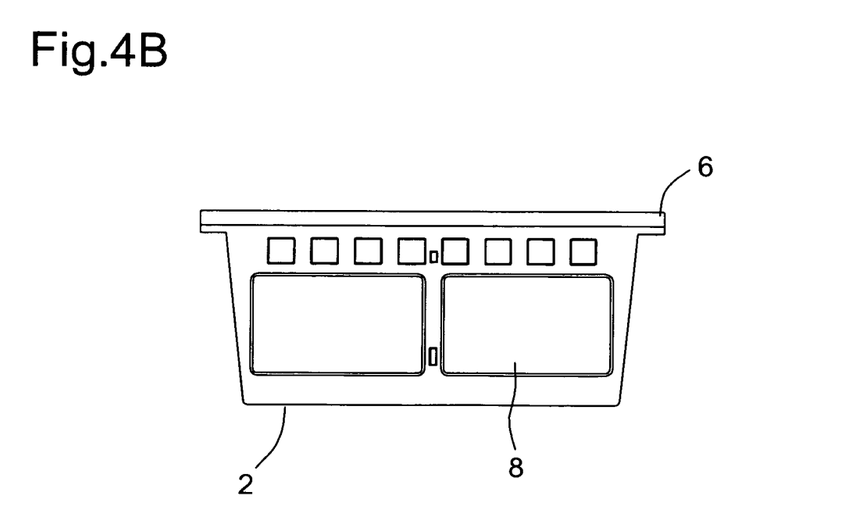
FIG. 4B is a front view of the bucket.
Figure 7:
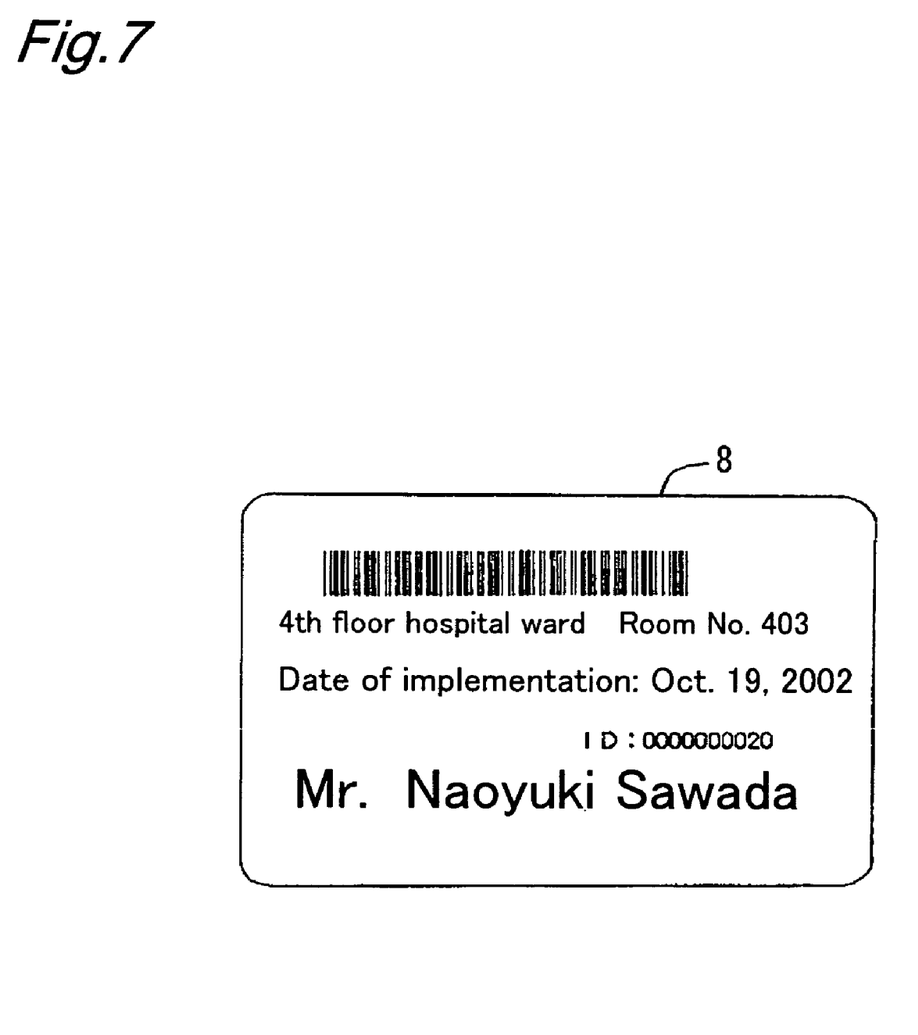
FIG. 7 is a plan view showing an identification card.

As shown in FIG. 4A and FIG. 4B, the bucket 2 has a box-like shape with an open top, and a brim portion 6 is formed at an aperture edge thereof. Engaging concaves 7 are respectively formed on both side portions atop of the brim portion 6 by providing projections on two spots, respectively. An identification card 8 is attachable/detachable on an end surface of the bucket 2. The identification card 8 may be a leuco-type or thermochromic-type of rewritable card capable of being rewritten upon heating to a specified temperature. The identification card 8 bears pieces of patient information as shown in FIG. 7.

The direction-changing portion 3 is connected to a medication supplying device 9 for supplying medications to the bucket 2. In the medication supplying device 9, medications prescribed to each patient in accordance with prescription information are sequentially stored in the buckets 2 and are transferred to the direction-changing portion 3.

The direction-changing portion 3 includes a transfer belt 10 and a turn table 11 for changing the direction of the bucket 2. As shown in FIG. 3, the transfer belt 10 is arranged such that belts 14 are respectively arranged around pulleys 13 provided at rotating axes 12 at a predetermined distance wherein one of the rotating axes 12 is rotatably driven by a motor 15. As shown in FIG. 2, the turn table 11 is disposed between both belts 14 and is provided in a freely elevating and rotating manner. By lifting and turning the bucket 2 transferred by the transfer belt 10, the identification card 8 of the bucket 2 is made to face in the same direction. A first bucket detecting sensor 16a and a second bucket detecting sensor 16b are provided proximate the turn table 11. The first bucket detecting sensor 16a is used for detecting that a bucket 2 is approaching the turn table 11 and for reducing the transfer speed of the transfer belt 10.

The second bucket detecting sensor 16b is used for detecting that the bucket 2 has been transferred to a turning position upward of the turn table 11 and for terminating transfer by the transfer belt 10. A stopper 17 for forcibly terminating movement of the bucket 2 at the turning position is provided proximate the turn table 11 (downstream side of the transfer direction) in a freely elevating manner.

Card detecting sensors 18 for detecting an identification card 8 attached to the bucket 2 are provided laterally of the turn table 11. In this embodiment, it is possible to attach the identification card 8 to a total of four spots, namely two spots on both end surfaces of the bucket 2, respectively. Therefore, by providing the card detecting sensors 18 on two spots and by turning the turn table 11 by 180 degrees in case the bucket 2 cannot be detected, the device is arranged such that the identification card 8 can be detected regardless of the location thereof.

A plurality of transfer rollers 100 are provided on a downstream side of the stopper 17 so that the bucket 2 can be transferred further downstream from the turning position. A stopper 101 is provided in a freely elevating manner on the downstream side of the turning position so that the movement of the bucket 2 can be forcibly terminated at a transfer preparation position. A rewrite device 19 is provided laterally of the stopper 101 so that pieces of information written on the identification card 8 can be rewritten in accordance with pieces of information written on prescriptions in a condition in which the bucket 2 is transferred to the transfer preparation position (in this embodiment, patient information are rewritten).

The transfer portion 5 is provided with a holding member 20 provided so as to be freely movable vertically and laterally within a transfer unit. A magnet sensor 22 for positioning and detecting the cart 4 (which will be discussed in detail below) and a lever detecting sensor 23 for detecting a rotating position of a lever 57 provided at the cart 4 are provided on a front surface side of a frame body 21 forming the transfer unit.

The transfer unit is provided, on both sides of its rear surface, with guiding axes 24 extending in a vertical direction, belts 25, elevating rails 26, and guiding guides 27 in this order from the rear surface side. Counter weights 24a are provided along the guiding axes 24 in a freely elevating manner, and elevating members 28 are provided along the elevating rails 26 in a freely elevating manner. The belts 25 are connected to the guiding axes 24 and the elevating members 28 and are driven through a motor for elevation (not shown) for elevating the elevating members 28. Cable chains 29 are guided along the guiding guides 28 for protecting electric wires. Supporting arms 31 for performing reciprocating movements in horizontal directions upon being driven by a motor for horizontal movement 30 are provided at the elevating members 28. The holding members 20 are provided at tip ends of the supporting arms 31.

Figure 5:
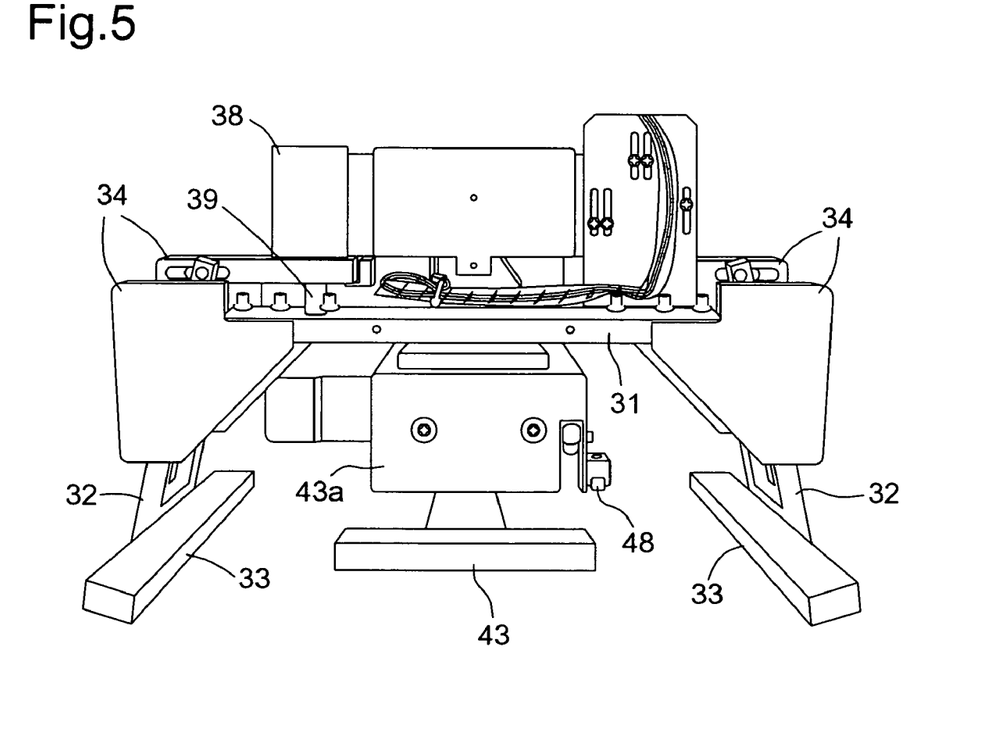
FIG. 5 is a front view of a holding member.
Figure 6:
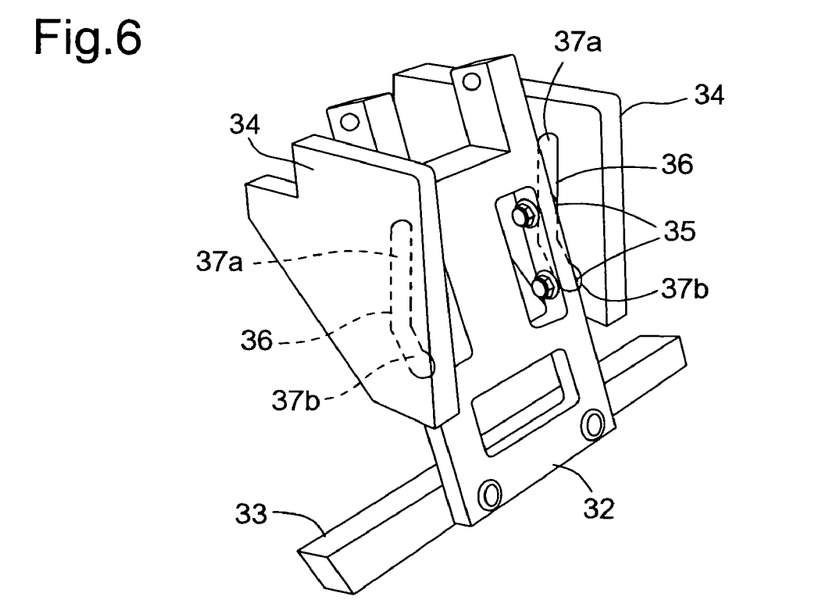
FIG. 6 is a partially enlarged perspective view of FIG. 5.

The holding members 20 are arranged such that holding pieces 33 are provided at lower end portions of a pair of opening/closing arms 32 so that the bucket 2 can be held from both sides upon opening and closing of these pieces. As shown in FIGS. 5 and 6, the opening/closing arms 32 perform elevating and opening/closing movements upon guiding both sides thereof through guiding plates 34. More particularly, guiding rollers 35 are provided on both side portions of the opening/closing arms 32 arranged at a specified distance. The guiding plates 34 are provided with guiding grooves 36 on which the guiding rollers 35 rotate. Each guiding groove 36 includes a vertical portion 37a on an upper side and a sloped portion 37b on a lower side. When both guide rollers 35 are located in the vertical portions 37a, they are at a holding position in which the holding pieces 33 are closest with respect to each other. And, as the lower guide rollers 35 move closer to the sloped portions 37b, the holding pieces 33 descend and gradually separate from each other. The opening/closing arms 32 are connected at their upper end portions to a supporting table 38 in a freely rotating manner. The supporting table 38 is provided in a freely elevating manner along axis portions 39 erected at tip ends of the supporting arms 31 at a predetermined distance. A rack 40 is formed on the supporting table 38 and a pinion 42, which is fixed to a rotating axis of a motor 41 for opening/closing movements, is in mesh therewith. Accordingly, when the motor 41 for opening/closing movements is driven, the supporting table 38 is elevated through the pinion 42 and the rack 40, and with the guiding rollers 35 rolling along the guide grooves 36, the opening/closing arms perform opening/closing movements while performing elevating movements.

As shown in FIG. 2, push-out portion supporting arms 43a are provided downward of the supporting arms 31 and push-out members 43 for performing reciprocating movements in a longitudinal direction are provided downward of the push-out portion supporting arms 43a. The push-out members 43 are coupled to belts 45 wound around pulleys 44 provided on both ends of the push-out portion supporting arms 43a and perform reciprocating movements in a longitudinal direction upon rotating one of the pulleys 44 through a motor 46. Rotation of the pulleys 44 is detected by an encoder 47, and moving positions of the push-out members 43 are controlled based on results of the detection thereof. The push-out members 43 move forward up to proximate of end surfaces of the bucket 2 held by the holding pieces 33 of the opening/closing arms 32, and are capable of supporting the brim portion 6 of the bucket 2 at their upper edge portions. The push-out members 43 push the bucket 2 out to the cart 4 side. As shown in FIG. 5, the push-out supporting arms 43a are provided with bucket presence/absence detecting sensors 48 at their tip ends so that presence/absence of buckets 2 stored in the cart 4 can be detected by detecting an identification card 8 attached to the buckets 2.

As shown in FIG. 3, the cart 4 is a frame-like body including a plurality of storage racks 49 arranged vertically and horizontally, wherein a lower end portion of the cart is provided with casters 50 at four corners thereof and the cart is freely movable upon gripping a grip 51 provided at an upper portion thereof. As shown in FIG. 4A, the storage racks 49 are arranged such they can support the brim portions 6 of the buckets 2 through guiding grooves 52 formed on both sides thereof.

Projections 53 are formed on both ends of lower edge portions 52a forming the guiding grooves 52. By guiding both ends of a brim portion 6 of a bucket 2 being transferred into the storage rack 49 through the projections 53, it is possible to stabilize the mounted condition of the bucket 2 in the storage rack 49. Relief concaves 54 are formed inside of the respective projections 53.

Projections 55 are respectively formed on both ends of upper edge portions 52b forming the guide grooves 52 at positions corresponding to the relief concaves 54 of the lower edge portions. It is possible to stabilize the holding condition of the bucket 2 in the storage rack 49 through the projections 55 and the projections 53. Pressing portions 56 capable of performing elevating movements are provided centrally of the upper edge portions 52b. The pressing portions 56 of the respective storage racks 49 are uniformly lifted to an unlocked position through a rod 58 upon rotating the lever 57 as shown in FIG. 3, and then descend to a locked position. At the locked position, the pressing portions engage engaging concave portions 7 formed on top central portions of the brim portions 6 of the buckets 2 mounted on the respective storage racks 49 for holding the buckets 2 so as to be unmovable. The rotated position of the lever 57, that is, the locked position facing vertically downward is detected by the lever detecting sensor 23 provided at the transfer portion 5, and the transfer portion 5 is drivable only when the lever is in the unlocked position.

Next, operations of the bucket transfer apparatus 1 of the above structure will be explained.

The cart 4 is moved to a position adjacent the transfer portion 5. The cart 4 is positioned by the magnet sensor 22 provided at the transfer portion 5. When the cart 4 is detected by the magnet sensor 22 and when it is detected by the lever detecting sensor 23 that the lever 57 is at the unlocked position, supply of medications to the buckets 2 is started per units of patients based on prescription information sent to the medication supplying device 9. Buckets 2 supplied with medications for one patient are sequentially transferred from the medication supplying device 9 to the direction-changing portion 3.

In the direction-changing portion 3, the stopper 17 is lifted and the transfer belt 10 is driven. The transfer belt 10 is then reduced in speed based on a detection signal of the first bucket detecting sensor 16a and, upon terminating operation of the transfer belt 10 based on a detection signal of the second bucket detecting sensor 16b, the bucket 2 is positioned smoothly on the turn table 11. Next, upon lifting the turn table 11 and holding the bucket 2 up, it is turned by 90 degrees for detecting an identification card 8 attached to the bucket 2 by means of the card detecting sensors 18. When no identification card 8 can be detected, the turn table 11 is turned by 180 degrees. In this manner, when the bucket 2 is turned such that the identification card 8 is positioned at the side of the card detecting sensors 18, the turn table 11 and the stopper 17 descend in order to restart driving of the transfer belt 10 and driving of the transfer rollers 100 is started. Movement of the bucket 2 is again terminated by the stopper 101, and upon rewriting contents of the identification card 8 by the rewrite device 19 based on pieces of prescription information, the bucket 2 is further transferred to the transfer portion 5.

In the transfer portion 5, the elevating members 28 descend and the supporting arms 31 are moved towards the direction-changing portion 3 so as to move the holding members 20 towards the transferred bucket 2. At this time, the motor for elevating movements is driven to release the opening/closing arms 32 and separate the holding pieces 33. When the holding members 20 move to a position at which they are capable of holding the bucket 2, the motor for elevating movements is driven such that the bucket 2 is held from both sides by means of the holding pieces 33, and brim portions 6 on both sides are supported on the holding pieces 33. At this time, the elevating members 28 are lifted and the supporting arms 31 are moved horizontally to move the bucket 2 to a storage rack 49 located on one end side of a topmost stage of the cart 4. At this time, the bucket presence/absence detecting sensor 48 detects whether a bucket 2 is stored in this storage rack 49 or not. When there is not, the bucket 2 is stored in this storage rack 49, and when there is, the bucket 2 is stored in an adjoining storage rack 49. The same operations are repeated until storage on all storage racks 49 of the topmost stage is completed, and storage on lower storage racks 49 is sequentially performed. In this manner, since buckets 2 are stored upon detecting through the bucket presence/absence detecting sensor 48 whether buckets 2 are stored in the respective storage racks 49 of the cart 4 or not, it is possible to automatically select an empty storage rack 49 and perform storage. Accordingly, even if a stored bucket 2 is being delivered to a patient in advance for emergency purposes or the like during storage operations of the buckets 3 into the cart 4, the next bucket 2 can be automatically stored in the empty space so that all storage racks 49 can be utilized without loss of storage space.

Figure 8A:
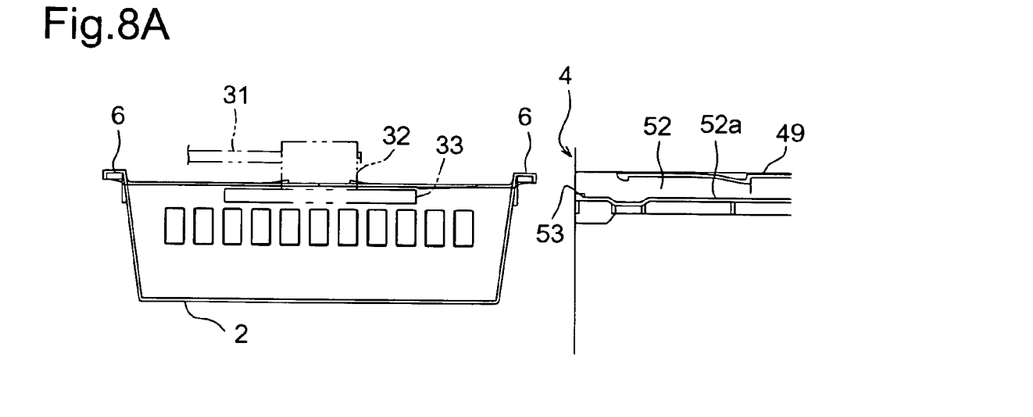
FIG. 8A to FIG. 8C are side views showing operations of storing the bucket on the cart in sequential form.
Figure 8B:
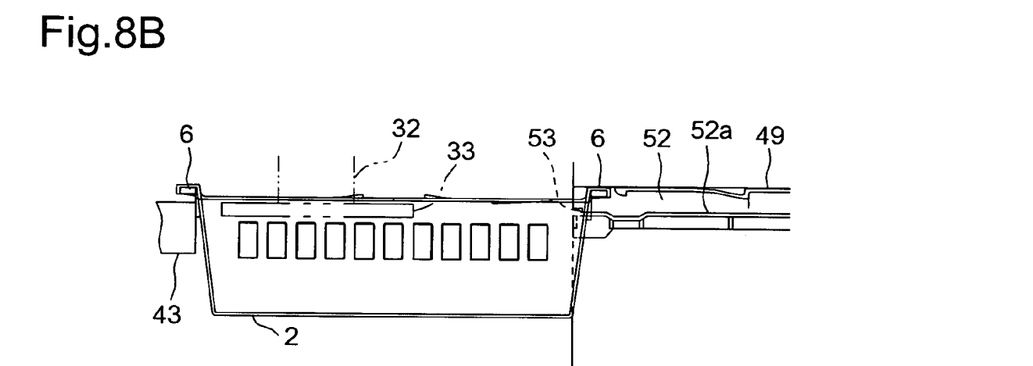
Figure 8C:
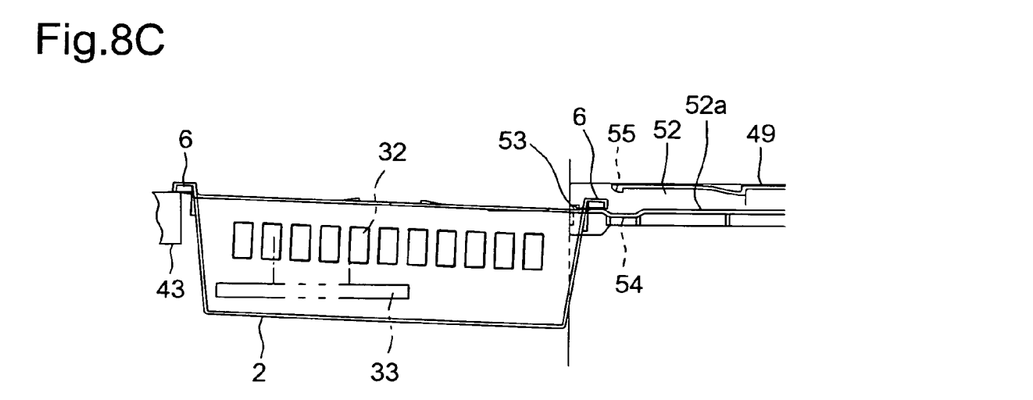

When performing storage of the buckets 2 on the storage racks 49, the supporting arms 31 are moved such that the brim portion 6 of the buckets 2 becomes higher than the lower edge portions 52a of the guide grooves 52 of the storage racks 49 as shown in FIG. 8A. Then, as shown in FIG. 8B, the push-out members 43 are moved forward for pressing a rear wall of the bucket 2 to move the bucket 2 towards the cart. With this arrangement, the brim portion 6 on the front end side of the bucket 2 enters the storage rack 49 and the front end portion is positioned upon moving across the projections 53 on the intrusion side. At this time, the motor for opening/closing movements 41 is driven to release the opening/closing arms 32. In the releasing operations of the opening/closing arm 32 as shown in FIG. 6, the guide rollers 35 on the lower side are slid from the vertical portions 37a of the guiding grooves 36 towards the sloped portions 37b whereby the holding pieces 33 descend while gradually separating. Accordingly, when the bucket 2 is released from the condition in which it is held by the holding pieces 33 as shown in FIG. 8C, the front ends of the push-out members 43 engage the brim portion 6 at the rear end side of the bucket 2 such that the brim portion 6 on the front end side of the bucket 2 is mounted to the lower edge portions 52a of the guiding grooves 52, and the bucket 2 itself inclines so that its front end is positioned below the level of its rear end. Therefore, when the push-out members 43 are further moved forward, the bucket 2 will be smoothly stored within the storage rack 49 without interfering with the projections 53 as shown in FIG. 4A. Further, since relief concaves 54 are formed at positions opposing the projections 55, the bucket 2 will not interfere with the projections 55, either. When the push-out members 43 are retracted upon completion of storage, it is possible to position the bucket 2 within the storage rack 49 in a stable condition by means of the projections 53, 55.

The invention claimed is:

1. A bucket transfer apparatus for transferring buckets to storage racks of a cart, the apparatus comprising:
   a conveyor;
   a turntable, disposed intermediate opposite ends of the conveyor, for lifting and rotating a bucket to adjust the position of the bucket on the conveyor;
   a bucket detecting sensor, provided proximate the turntable, for detecting the position of the bucket on the conveyor;
   a transfer frame;
   an elevating device operably supported in the transfer frame;
   a supporting arm connected to the elevating device and being movable in a horizontal direction perpendicular to a bucket storage direction along which a bucket is transferred to a storage rack of the cart;
   first and second holding devices connected to first and second ends of the supporting arm, respectfully, wherein the first holding device comprises a first opening/closing arm, a first holding piece provided at a lower end of the first opening/closing arm, first guiding rollers provided on opposite sides of the first opening/closing arm, and a pair of first guiding plates each having a guiding groove for receiving the at least one of the first guiding rollers on a corresponding side of the first opening/closing arm, wherein the second holding device comprises a second opening/closing arm, a second holding piece provided at a lower end of the second opening/closing arm, second guiding rollers provided on opposite sides of the second opening/closing arm, and a pair of second guiding plates each having a guiding groove for receiving at least one of the second guiding rollers on a corresponding side of the second opening/closing arm, wherein the first and second opening/closing arms are arranged to close while being lifted to hold the bucket from opposite sides of the bucket storage direction and to open while descending to release the bucket; and a push-out member for pushing the bucket, held by the first and second opening/closing arms, out in a horizontal direction that is parallel to the bucket storage direction;

wherein, when pushing the bucket out by the push-out member, the push-out member engages a rear wall of the bucket below a brim portion of the bucket, and, when a front end of the bucket is located above a brim supporting portion of the storage rack on an intrusion side thereof, the first and second opening/closing arms are moved downwardly and opened to release the holding condition of the bucket, and thereby the bucket is delivered by the push-out member at an angle with respect to the storage racks.

2. The bucket transfer apparatus as claimed in claim 1, wherein each of the first and second guiding grooves comprises an upper vertical portion and a lower sloped portion, wherein, when the first and second guiding rollers are in the vertical portions of the guiding grooves, the first and second opening/closing arms are in a closed position.

3. The bucket transfer apparatus as claimed in claim 2, wherein, as the first and second guiding rollers begin to enter the sloped portions of the guiding grooves, the first and second opening/closing arms gradually separate from each other.

4. The bucket transfer apparatus as claimed in claim 3, wherein upper ends of the first and second opening/closing arms are pivotally connected to a supporting table, which is movable in a vertical direction.

5. The bucket transfer apparatus as claimed in claim 4, further comprising a motor including a pinion fixed on a rotating shaft of the motor, wherein a rack is formed on the supporting table and the pinion is in mesh with the rack to effect opening/closing movements of the first and second opening/closing arms.

6. A bucket transfer apparatus for transferring buckets to storage racks of a cart, the apparatus comprising:

a transfer frame;

an elevating device operably supported in the transfer frame;

a supporting arm connected to the elevating device and being movable in a horizontal direction perpendicular to a bucket storage direction along which a bucket is transferred to a storage rack of the cart;

first and second holding devices connected to first and second ends of the supporting arm, respectfully, wherein the first holding device comprises a first opening/closing arm, a first holding piece provided at a lower end of the first opening/closing arm, first guiding rollers provided on opposite sides of the first opening/closing arm, and a pair of first guiding plates each having a guiding groove for receiving the at least one of the first guiding rollers on a corresponding side of the first opening/closing arm, wherein the second holding device comprises a second opening/closing arm, a second holding piece provided at a lower end of the second opening/closing arm, second guiding rollers provided on opposite sides of the second opening/closing arm, and a pair of second guiding plates each having a guiding groove for receiving at least one of the second guiding rollers on a corresponding side of the second opening/closing arm, wherein the first and second opening/closing aims are arranged to close while being lifted to hold the bucket from opposite sides of the bucket storage direction and to open while descending to release the bucket; and a push-out member for pushing the bucket, held by the first and second opening/closing arms, out in a horizontal direction that is parallel to the bucket storage direction;

wherein, when pushing the bucket out by the push-out member, the push-out member engages a rear wall of the bucket below a brim portion of the bucket, and, when a front end of the bucket is located above a brim supporting portion of the storage rack on an intrusion side thereof, the first and second opening/closing arms are moved downwardly and opened to release the holding condition of the bucket, and thereby the bucket is delivered by the push-out member at an angle with respect to the storage racks.

7. The bucket transfer apparatus as claimed in claim 6, wherein each of the first and second guiding grooves comprises an upper vertical portion and a lower sloped portion, wherein, when the first and second guiding rollers are in the vertical portions of the guiding grooves, the first and second opening/closing arms are in a closed position.

8. The bucket transfer apparatus as claimed in claim 7, wherein as the first and second guiding rollers begin to enter the sloped portions of the guiding grooves, the first and second opening/closing arms gradually separate from each other.

9. The bucket transfer apparatus as claimed in claim 8, wherein the upper ends of the first and second opening/closing arms are pivotally connected to a supporting table, which is movable in a vertical direction.

10. The bucket transfer apparatus as claimed in claim 9, further comprising a motor including a pinion fixed on a rotating shaft of the motor, wherein a rack is formed on the supporting table and pinion is in mesh with the rack to effect opening/closing movements of the first and second opening/closing arms.

* * * * *

UNITED STATES PATENT AND TRADEMARK OFFICE
CERTIFICATE OF CORRECTION

PATENT NO. : 7,775,756 B2
APPLICATION NO. : 11/578246
DATED : August 17, 2010
INVENTOR(S) : Naoki Koike et al.

Page 1 of 1

It is certified that error appears in the above-identified patent and that said Letters Patent is hereby corrected as shown below:

On the Title Page

Section (57) Abstract should read --A bucket carrier for carrying buckets (2) to store them in storage shelves of a cart (4). The bucket carrier includes a holding device (20) for holding buckets (2), and carrier device (28) for carrying the buckets (2) held by the holding device (20) to each storage shelf (49) of the cart (4). The arrangement is such that the holding device (20) and a transfer device (49) are drive-controlled so that each of the buckets (2) will be transferred to the storage shelves (49) in an inclined position from above. Thereby, the buckets (2) can be automatically stored in the cart (4).--.

Signed and Sealed this
Twenty-eighth Day of December, 2010

David J. Kappos
*Director of the United States Patent and Trademark Office*